March 25, 1969 W. P. HICKEY ET AL 3,435,241
STRUCTURE INSPECTION EQUIPMENT
Filed Jan. 7, 1964
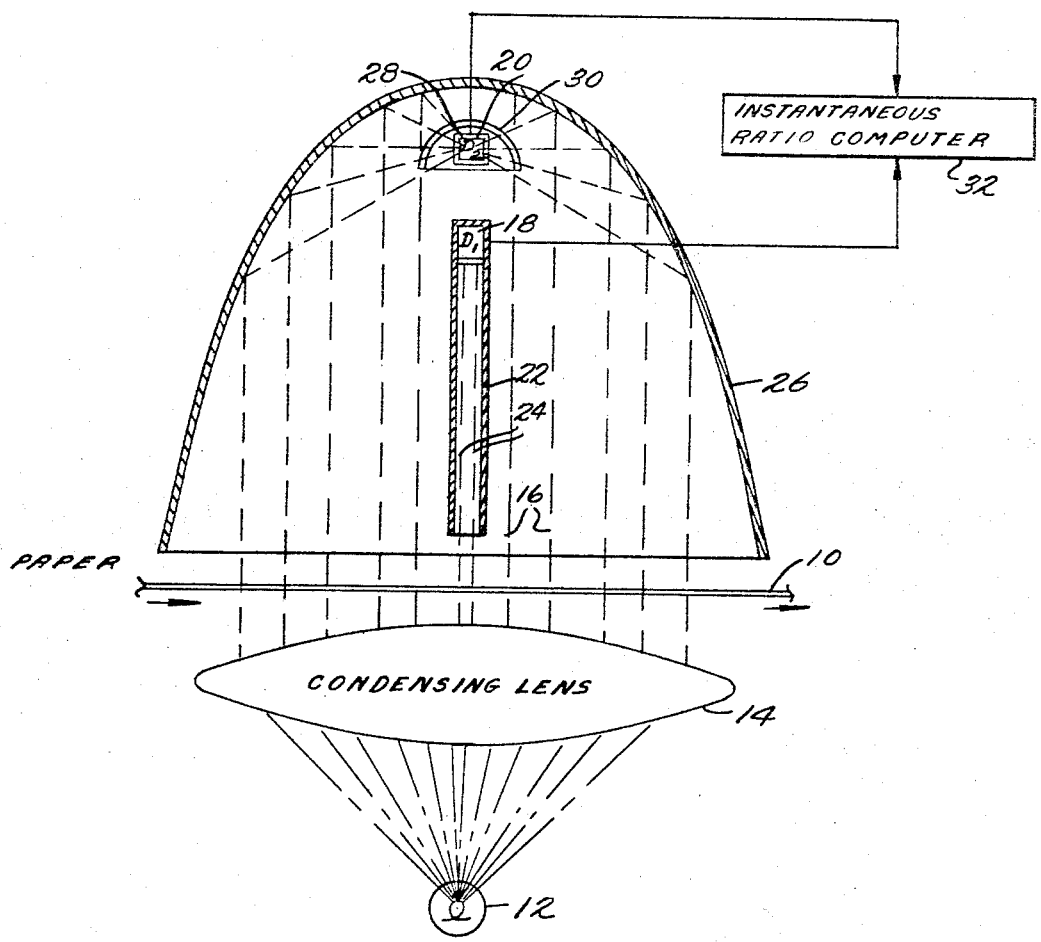
INVENTORS
WILLIAM P. HICKEY
PHILIP T. MARTIN
BY Cushman, Darby & Cushman
ATTORNEYS

United States Patent Office 3,435,241
Patented Mar. 25, 1969

3,435,241
STRUCTURE INSPECTION EQUIPMENT
William P. Hickey, Hilliard, and Philip T. Martin, Columbus, Ohio, assignors to Industrial Nucleonics Corporation, a corporation of Ohio
Filed Jan. 7, 1964, Ser. No. 336,232
Int. Cl. G01n 21/30; G01l 5/04
U.S. Cl. 250—219    11 Claims

ABSTRACT OF THE DISCLOSURE

An apparatus for determining the structural formation of paper material. By taking into account a large background area and a comparably smaller area through two coaxially placed detectors which sense the instantaneous variations of light intensities emanating from the two areas, the apparatus derives an indication of the material structure such as the arrangement of fibers in paper. The output signal is attained by an instantaneous ratio computation of the two sensed signals.

---

This invention relates to inspecting material as to its structure, and more particularly to determining the uniformity of or variations in the distribution of randomly oriented elements in material, for example the arrangement of fibers in a sheet of paper. Hence, this invention relates to gauging the "formation" of paper or other materials which will transmit radiation signals indicative of structural characteristics thereof.

For an introduction to this general type of gauging, reference may be made to the Burkhard et al. article "A Formation Tester Which Graphically Records Paper Structure," which appeared in the June 1960 issue of Pulp and Paper Magazine of Canada, beginning at page T–319. There, it is indicated that when a sheet of paper looks uniform on viewing it up to the light, its formation is called good, while an irregular, grainy or blotchy structure may be described as such or may be called "wild" formation.

It is the foremost object of this invention to provide improved apparatus for determining the structural variations in material, such as the formation of paper.

By this invention, an electronic measurement is made of the variation in the percent transmittance of light through paper being tested, with means being provided to effect an output corresponding to the formation of the paper.

It has been suggested in the past that the ratio of the AC to the DC component of transmitted light, expressed as a percentage, be taken as indicative of the formation wildness: see page 1278 of Pulp and Paper, Volume III, Second Edition, by Casey; Williams patent 2,844,068; and the C. J. Moen Papers "A Formation Standard," Tappi, April 1958, Volume 41, No. 4, pages 212A–213A, and "Theory of Differential Sensing," starting at page 34 of the Technical Section, Tappi, January 1963, Volume 46, No. 1. In these disclosures, and also in the Eastwood Paper published in the last mentioned Tappi beginning at page 32 and entitled "A Continuous Two-Spot Formation Recorder," there is the suggestion that two spots of light be employed to measure formation of paper. However, these spots of light are of equal size and the differences between the signals attained therefrom do not present an accurate indication of paper formation, because they do not take into account a large background area.

It is therefore an object of the present invention to provide a formation determining apparatus which does take into account a large background area, by operating in a manner similar to the human eye when it observes the structure of paper having light passing through it. It has been found that the eye sees the variation in the present transmittance of light through the sheet of paper. In effect, the eye compares the light coming through any one small spot with the average of the transmitted light from the vicinity of that spot, for example from a relatively large area surrounding the small spot area.

In accordance with the present invention, which is based on the above discovery of the workings of the eye in evaluating paper as to its formation, this invention compares the transmittance from a small spot of light on the paper with that of a much larger area of light on the paper.

The basic invention of comparing, as by taking the instantaneous ratio of, relatively narrow and wide beam energy signals transmitted from the material whose structure is being inspected, is fully described and claimed in the co-pending Brunton application, Ser. No. 335,030, filed Jan. 2, 1964. The specific embodiment described in detail therein suggests that two photomultipliers be directed toward respective large and small areas on the moving transilluminated paper or material to be inspected, the areas preferably being of an overlapped nature such that the larger surrounds the smaller. The instantaneous variations sensed from the smaller spot indicate changes in structure such as the arrangement of fibers in paper, while the signal from the larger area represents the instantaneous average of the radiation signal transmitted from the associated large vicinity of the smaller spot. The two signals are compared, then, by instantaneous ratio computer, which may take any one of a variety of forms as fully explained in that Brunton application. Since both the large and small radiation beams vary equally with changes in basis weight or thickness of the material, the ratio computation provides a signal representing the true variation in structure, i.e., formation.

In the instant application, a unique manner of producing and sensing the radiant energy is the primary object. In a specific embodiment, a pin point source of light is directed to a condensing lens which provides parallel light rays through a moving web of paper being inspected. The trans-illuminated paper has on its opposite side a small area or narrow beam collimator in the central area of the parallel light rays, with a detector being disposed at the opposite end of the collimator to collect the light which passes through the small area of the paper. Concentrically surrounding this collimator is a paraboloidal mirror with a mouth opening toward the paper and wide enough to see a relatively large area of the parallel light rays from the paper. Being parabolic, the mirror reflects the parallel light rays to its focal point, where there is disposed a second detector, which detects the average instantaneous light of the large area. Disposed adjacent the second detector may be located a light filter for adjusting the intensity of light received by the second detector, and the outputs of the two detectors are applied to an instantaneous ratio computer.

It is therefore a specific object of this invention to provide apparatus of the type just described, whereby numerous advantages described below may be obtained in the determination of formation change.

Still other objects of this invention will become apparent to those of ordinary skill in the art, upon reading the appended claims and the following detailed description of an embodiment of the invention in conjunction with the attached drawing.

In the drawing, the material to be inspected, such as a sheet or web of paper 10, is moved longitudinally as indicated by the arrows in any desired manner, such as by paper manufacturing equipment, specifically calendars or the like. To check this sheet of paper for its formation, and/or to control the formation thereof in any manual or automatic feed-back manner desired, a source of radiation such as the pin point light source 12 has its rays directed onto a double-convex condensing lens 14. In accordance with well known characteristics of such a lens, the output light rays therefrom are parallel, as indicated by dash lines 16. The relative orientation of paper 10 and lens 14 is such that the parallel light rays transilluminates the paper perpendicularly of its length and breadth.

On the side of the paper opposite the light source and condensing lens, are two radiant energy detectors 18 and 20, which may be any desired type of photodetectors, such as photodiodes. These detectors are located on the same axis as light source 12 and lens 14, with the detector 18 being slightly closer to paper 10 than detector 20. Though shown separated, the detectors in practice may actually be in the same unit for convenience.

Surrounding the central axis of light source 12, lens 14, and the two detectors 18 and 20, is a collimating tube 22, which is directed over a small central area of the paper to collect the parallel light rays 24 therefrom. The length of this collimator is opaque, so that no other light than the collected parallel rays, such as rays 24, reach detector 18.

On the other hand, detector 20 collects light from a much larger area, for example all of the parallel light rays from condensing lens 14 that pass through the paper except rays 24. This is accomplished by the inverted paraboloidal mirror 26, at the focal point 28 of which is located the large area detector 20. As is well known for paraboloids, input rays which are parallel to the axis thereof as here, are reflected by the paraboloid to its focal point. Consequently, detector 20 receives the parallel light rays from lens 20 which are not intercepted by collimator 22.

Disposed in the vicinity of detector 20, in any suitable manner, is a light filter 30, which may be employed for adjusting the initial light intensity received by detector 20, so that it will be equal to the light intensity initially received by detector 18. This provides for the desired initial comparative base.

Detector 18 senses all variations in the formation of paper 10 as it moves longitudinally, and provides a corresponding instantaneous signal to computer 32. On the paper, the small area associated with detector 18 is surrounded concentrically by the relatively large paper area associated with the paraboloidal light collecting mirror 26. Of course, the area of light stands still as the paper moves along, thereby causing inspection of successive areas of the paper. The instantaneous average light, in parallel rays, as detected at the focal point of the mirror by detector 20, causes a signal to computer 32, which compensates for any variation in basis weight or the like, since both detectors vary approximately equal to this respect. Consequently, the successive instantaneous ratios continuously determined by the computer give the relative formation of the paper area for area as it traverses the equipment. Suitable ratio computers which can be used in the subject application are found in the patent to Heacock, Jr., No. 3,024,999, issued on Mar. 13, 1962 and the patent to Larse, No. 2,905,385, issued on Sept. 22, 1959. A formation change indicator may be connected to the computer if desired, for example a recorder.

Because the parabolic mirror 26 omits focusing any non-parallel light rays that may be from extraneous sources, only the light beam from the large area of paper covered by the mirror is detected. Various advantages of the arrangement illustrated in the drawing and discussed above are available because of the structural arrangement. The overall function of the device provides both high and low resolution detection, thus enabling the extraction of formation information. The unit is symmetrical and requires only one detector unit as above explained. Furthermore, only one light source and optical system are necessary. The system is relatively insensitive to extraneous or scattered light, and to "flutter" or variations in the distance between paper and detector, by virtue of the detection of only parallel light rays.

Since the detectors are in the same environment, the possibility of error caused by different environment is decreased. Variations in light intensity will affect both detectors almost equally, making the overall system relatively insensitive to light variation. Due to the concentric geometry of the detectors, both of them may be made to have similar areas of vision around the ideal ray.

Thus it is apparent that this invention has provided apparatus which will accomplish the objects and advantages as above indicated. Further objects and advantages, and even modifications of the invention, will become apparent to those of ordinary skill in the art upon reading the foregoing disclosure. However, it is intended that this disclosure be considered exemplary and not limitative, the invention being defined by the appended claims.

What is claimed is:

1. In apparatus for inspecting material as to its formation structure by making a comparison of narrow and wide beam energy signals transmitted from the material, the improvement comprising:
    means disposed at a first distance from said material for detecting a transmitted relatively narrow beam of said energy, and
    means including detector means at a second and further distance from said material for detecting a transmitted relatively wide energy beam concentrically surrounding said narrow beam.

2. In apparatus for inspecting material as to its formation structure, the improvement comprising:
    means for causing radiant energy to be transmitted through said material from a given area thereof,
    first and second coaxial means for detecting said energy,
    collimating means for said first detecting means, disposed to receive said energy from a portion of said area, and
    means including second collimating means and reflection means disposed to receive said energy from substantially all of said area and reflect it to said second detecting means.

3. Apparatus as in claim 2 wherein said radiant energy causing means effects parallel rays of energy.

4. Apparatus as in claim 3 wherein said radiant energy causing means includes a source of radiant energy and a lens for causing the said parallel rays.

5. In apparatus for inspecting material as to its formation structure, the improvement comprising:
    means for causing radiant energy to be transmitted through said material from a given area thereof,
    first and second means for detecting said energy,
    collimating means for said first detecting means, disposed to receive said energy from a portion only of said area, and,
    means including second collimating means and reflecting means disposed to receive said energy from substantially all of said area and reflect it to said second detecting means, wherein said collimating means are substantially concentric of each other, said second collimating means being substantially concentric of said area.

6. In apparatus for inspecting material as to its formation structure, the improvement comprising:
    means for causing radiant energy to be transmitted through said material from a given area thereof,
    first and second means for detecting said energy,
    collimating means for said first detecting means, disposed to receive said energy from a portion only of said area, and,
    means including second collimating means and reflecting means disposed to receive said energy from substantially all of said area and reflect it to said second detecting means, wherein said second collimating means and reflection means include a parabolic reflector having said second detecting means disposed at its focal point.

7. In apparatus for inspecting material as to its formation structure, the improvement comprising:
means for causing radiant energy to be transmitted through said material from a given area thereof,
first and second means for detecting said energy,
collimating means for said first detecting means, disposed to receive said energy from a portion only of said area, and,
means including second collimating means and reflecting means disposed to receive said energy from substantially all of said area and reflect it to said second detecting means, and further including means for regulating the amount of energy received by one of said detecting means relative to the other.

8. In apparatus for gauging formation of paper during relative movement thereof with said apparatus, the improvement comprising:
means for transilluminating said paper with a given effective area of parallel rays of light during said relative movement,
a parabolic mirror having a focal point and being disposed concentrically of said area on the opposite side of said paper for collecting the said light transmitted therethrough from substantially all of said area,
a collimating cylinder disposed concentrically within said mirror for collecting light transmitted by said paper from only a small portion of said area,
first and second light detectors disposed respectively at said focal point and in the far end of said cylinder adjacent said first detector for detecting the respective amounts of transmitted light thereat, and
means for comparing the outputs of said detectors.

9. Apparatus as in claim 8 and further including means for causing the light intensities received by the two detectors under given conditions to be equal.

10. In apparatus for inspecting paper material as to its formation structure by making a comparison of narrow and wide beam energy signals transmitted from the material, the improvement comprising:
means disposed at a first distance from said material for detecting a transmitted relatively narrow beam of said energy,
means including detector means at a second and further distance from said material for detecting a transmitted relatively wide energy beam concentrically surrounding said narrow beam, and
means for comparing the outputs of said detectors and deriving a ratio thereof.

11. In apparatus for inspecting paper material as to its formation structure, the improvement comprising:
means for causing radiant energy to be transmitted through said material from a given area thereof about a given axis,
first and second means disposed successively along said axis for detecting said energy,
collimating means for said first detecting means, disposed on said axis to receive said energy from a portion of said area, and
means including second collimating means and reflection means disposed on said axis to receive said energy from substantially all of said area and reflect it to a second detecting means.

References Cited

UNITED STATES PATENTS

| | | | |
|---|---|---|---|
| 1,917,379 | 7/1933 | Lowry | 250—219 |
| 2,429,331 | 10/1947 | Sachtleben | 250—219 |
| 3,059,119 | 10/1962 | Zenoy | 250—230 |
| 3,098,934 | 7/1963 | Wilson et al. | 250—203 |
| 3,114,791 | 12/1963 | Zabel et al. | 250—219 |

WALTER STOLWEIN, *Primary Examiner.*

U.S. Cl. X.R.

73—159